FIG. 1

May 17, 1960    J. LUSTI    2,936,859
ELEVATOR CONTROL SYSTEM
Filed March 12, 1959    4 Sheets-Sheet 2

FIG. 2

JOHN LUSTI INVENTOR
BY A. J. DeAngelis ATTORNEY

May 17, 1960  J. LUSTI  2,936,859
ELEVATOR CONTROL SYSTEM
Filed March 12, 1959  4 Sheets-Sheet 3

FIG.3

JOHN LUSTI INVENTOR
BY *Q. J. De Angelis* ATTORNEY

May 17, 1960 — J. LUSTI — 2,936,859
ELEVATOR CONTROL SYSTEM
Filed March 12, 1959 — 4 Sheets-Sheet 4

FIG. 4

JOHN LUSTI INVENTOR
BY *A. J. De Angelis* ATTORNEY

United States Patent Office 2,936,859
Patented May 17, 1960

2,936,859

ELEVATOR CONTROL SYSTEM

John Lusti, River Vale, N.J., assignor to Otis Elevator Company, New York, N.Y., a corporation of New Jersey Application March 12, 1959, Serial No. 798,924

20 Claims. (Cl. 187—29)

The invention relates to control systems for elevators operating together as a group.

It is common practice in elevator control systems to provide mechanism for automatically stopping the cars in response to calls registered from the landings. During upward travel of the cars, stops are made in response to up landing calls and during downward travel of the cars, stops are made in response to down landing calls. It often happens, particularly in certain types of buildings, that a number of down landing calls are unanswered ahead of the cars. This may result in cars being delayed in arriving at the lower terminal, which is especially undesirable where the cars are subject to dispatching mechanism for dispatching them on their upward trips. Also, it may result in one or more cars becoming filled sufficiently to cause some of these calls to be bypassed by such cars on their trips to the lower terminal.

The object of the invention is to increase the operating efficiency of an elevator system under conditions where a certain number of down landing calls are unanswered ahead of the leading car.

The invention involves controlling the operation of the cars, under conditions where preferably more than one car is waiting at the lower terminal and a certain number of down landing calls exists ahead of the leading car, to cause one of such lower terminal cars to answer at least the lowermost of such calls and return to the lower terminal.

The invention is especially applicable to elevator systems in which the cars are automatically dispatched on their upward trips from a lower terminal. Cars available at the lower terminal are selected for dispatching. As applied to systems in which the cars are operated without attendants, the selected cars are automatically started on their upward trips by the dispatching mechanism. The invention will be described as applied to such a system.

In carrying out the invention according to the preferred embodiment, when there are two or more cars at the lower terminal, one selected for dispatching, and a certain number of down landing calls are unanswered ahead of the leading car, an unselected car is automatically started in the up direction and is stopped at the lowermost of the landings for which such unanswered down landing calls are registered, whereupon it is returned to the lower terminal.

In carrying out the invention according to another embodiment which may be preferred for certain buildings having a relatively large number of landings, when the aforementioned conditions arise, an unselected car is automatically started upward and stopped at a landing for which a down landing call is registered and which is located above a predetermined number of landings for which down landing calls exist. The car is then returned to the lower terminal.

In carrying out the invention according to another embodiment particularly suitable for certain buildings having a relatively large number of landings, when the aforementioned conditions arise, an unselected car is automatically started upward and is stopped at the highest landing in a certain low zone for which a down landing call is registered, provided that at least one of such unanswered down landing calls is for a landing above the low zone and at least one other of such unanswered down landing calls is for a landing within the low zone. The car is then returned to the lower terminal.

In accordance with each of the foregoing embodiments of the invention, when such unselected car has been started upward to answer a down landing call, it is caused automatically to bypass up landing calls during its upward movement. During its downward trip it stops for all unanswered down landing calls ahead of it. In the case of the first mentioned embodiment, this condition could arise where such down landing call was registered after the call pickup point has been passed on the upward trip. Each of these arrangements has the advantage that it obviates or at least minimizes any delay in the return of the leading car to the lower terminal and obviates automatic bypassing of such down landing call or calls. When a car, due to its carrying a certain load, is automatically bypassing landing calls, it is disregarded in the measurement of unanswered down landing calls and, if it is ahead of the other cars, the next car is the leading car in determining the number of down landing calls ahead of the cars. Should all cars be at the lower terminal, the selected car may be regarded as the leading car.

Features and advantages of the invention will be seen from the above, from the following descriptions of the operation of the preferred embodiments when considered in conjunction with the drawings and from the appended claims.

The invention will be illustrated, by way of example, as applied to the dispatching and control system of the Glaser and Lusti Patent No. 2,682,318. That patent discloses a dispatching and control system for a three-car group of elevators operating with or without attendants wherein the elevators are selected and dispatched according to any one of four operating programs, depending upon which program is selected for the particular existing traffic conditions. The subject invention, while not so limited will be disclosed as applied to cars operating without attendants under conditions where the traffic in both the up and down directions is substantially equal.

For simplicity, only the circuits of the aforementioned Glaser and Lusti patent involved in the operation of the subject invention have been duplicated herein and the original identifying designations of such circuit elements have been retained.

Differentiation will be made between the different elevators by appending to the characters, employed to designate the various elements of the system, lower case letters "a," "b" and "c," indicative of the different elevators.

Only the contacts of electromagnetic switches and relays designated as follows are illustrated, it being understood that the circuits for their activating coils are as illustrated in the Glaser and Lusti patent:

BMT—Basement relay
DDR—Down dispatching relay
E—Speed switch
EY—Auxiliary speed switch
F—Second speed switch
GH—Door limit switch
HCL—Up dispatching relay
HG—Highest car call switch
HLR—Home landing relay
HR—Highest call reversal switch
LCS—Lowest call switch
LT—Light traffic switch
NO—Non-stop relay
NT—Hall time switch
PMY—Pawl magnet relay (on selector)
UD—Up-down traffic switch
XCS—Dispatching removal relay The electromagnetic switches and relays employed in the system illustrated, for which the circuits of their respective coils are shown, are designated as follows:

ATR—Auxiliary time relay
DCU—Down call up switch
DG—Direction holding switch
DGD—Auxiliary down direction switch
DGU—Auxiliary up direction switch
DS—Down direction switch
H—Field and brake switch
HRX—Auxiliary highest call reversal switch
HS—Auxiliary stop relay
MDCB—Multiple down call ahead switch
MDCBX—Auxiliary multiple down call ahead switch
ML—Main landing switch
SC—Selection relay
SR—Starting relay
US—Up direction switch
UTR—Up time relay
XB—Call below switch
Y—Down call reversal switch
ZD—Highest down call zone reversal switch
1ZL–3ZL—Low zone call ahead switches
1ZU–3ZU—Upper zone call ahead switches Switches and relays ATR, DG, DGU, DS, H, HRX, HS, SC, SR, US and UTR are switches and relays of the aforementioned Glaser and Lusti patent but with the circuits for their coils arranged in accordance with the subject invention.

In the wiring diagrams, identifying letters are applied to the coils of the electromagnetic switches and relays and, with reference numerals appended thereto, are applied to the contacts of the switches and relays to differentiate between different sets of contacts on the same switch or relay, all contacts being shown for the unoperated condition of the switches and relays. Switch DG which is a latching type, has two coils, one an operating coil and the other a reset coil and is shown in reset condition. Manually operated switches are designated TPS, KS1, KS2, KS3, KS4 and KS5.

Figure 1:
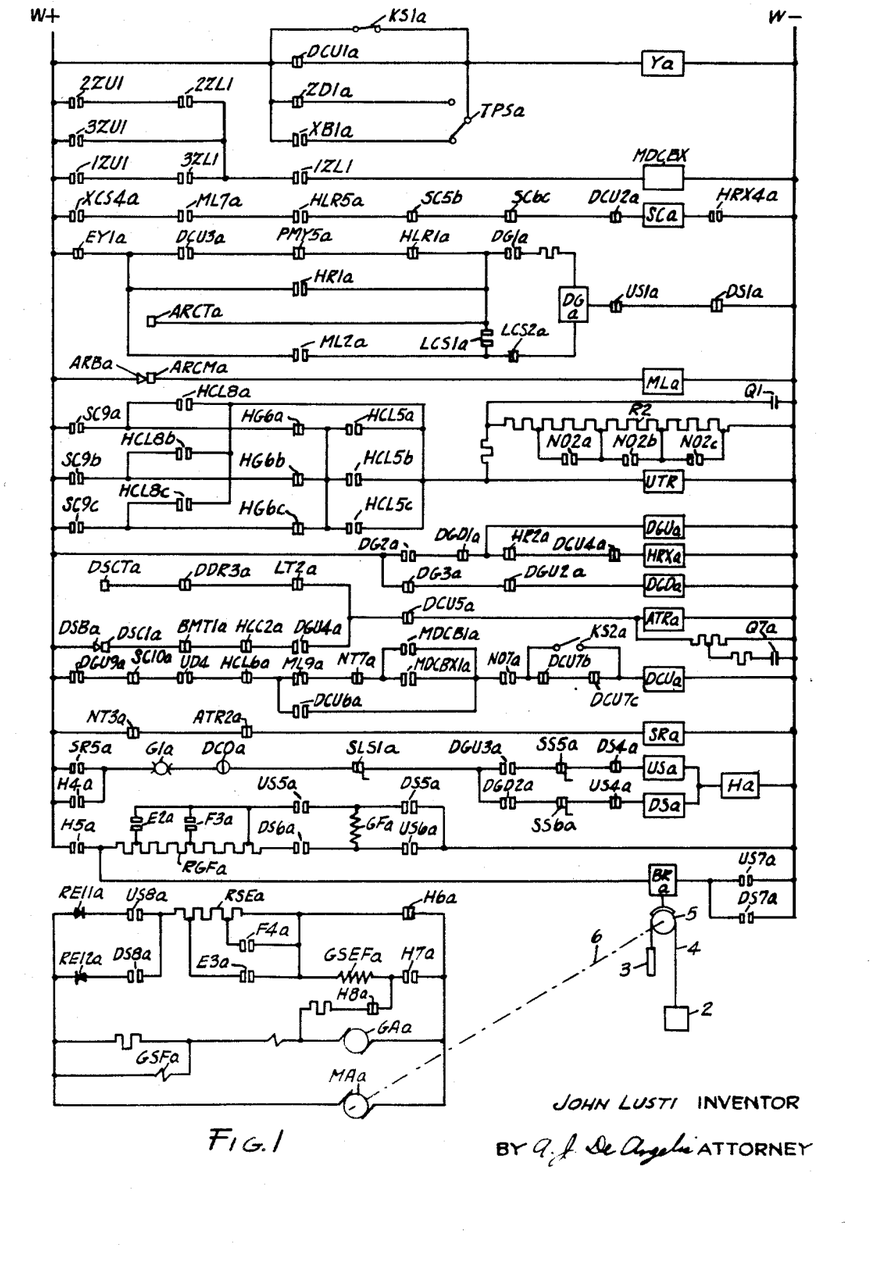
Figure 1 is a simplified schematic wiring diagram of a portion of an elevator power and control system for one elevator car; and also including certain circuits common to the elevators of the group.

In Figure 1, for simplicity, the circuits which are individual to each car are shown only for car $a$, it being understood that like circuits are provided for cars $b$ and $c$. BR$a$ designates the release coil of the electromechanical brake. Car 2 connected to counterweight 3 is raised or lowered by means of hoisting roping 4 passing over sheave 5 mounted on shaft 6 of the hoisting mechanism. The hoisting mechanism consists of a direct current hoisting motor having an armature MA$a$ supplied with current at a variable voltage from a generator armature GA$a$ which is rotated by a driving motor (not shown). The hoisting motor field winding has not been shown. The generator has a self-excited field winding designated GSEF$a$, a series field winding GSF$a$ and a separately excited field winding GF$a$. Switches E and F control the strength of the generator separately excited field GSEF$a$ and self-excited field GSF$a$ by means of resistors RGF$a$ and RSE$a$ provided in the respective generator field circuits to effect acceleration and deceleration of the car.

Mechanism actuated in accordance with movement of the elevator car is utilized in the circuits of each elevator. Such mechanism may be in the form of a selector machine having a synchronous panel and an advancer panel, as described in connection with Figures 1 and 2 of the aforementioned Glaser and Lusti patent.

The following brushes, stationary contacts and mechanically actuated switches on the selector are shown in the wiring diagrams. Selector switch SLS1 has to do with slowing down and stopping the elevator car. Brushes BHDD, UPB, DPB, BHD, carried by the advancer panel and DSB, ARB carried by the synchronous panel are in position to engage their corresponding contacts HDD, UH, DH, HD, DSCT or DSC, and ARCM or ARCT, respectively. Each of the brushes designated BHDD is mounted on a lever for effecting the separation of contacts DHDD when the brush engages a stationary contact HDD. Brushes designated BHD are constructed so as to span momentarily two successive stationary contacts in travelling from one such contact to the next one. The arrangement of these mechanical switches, brushes and stationary contacts is the same for each elevator.

Terminal stopping switches SS5$a$, SS6$a$ are mounted at the top and bottom of the hoistway, respectively, and are actuated by car movement to insure stopping of the car, as it approaches its limits of travel. Car gate switch G1$a$ and hoistway door switch DCO$a$ are actuated by door movement and are shown for the closed position of the car and hoistway doors, respectively.

Supply lines W+ and W— apply unidirectional power to the circuits of Figure 1, excluding the generator armature GA$a$, its field windings GSEF$a$, GSF$a$, and hoisting motor armature MA$a$.

Figure 2:
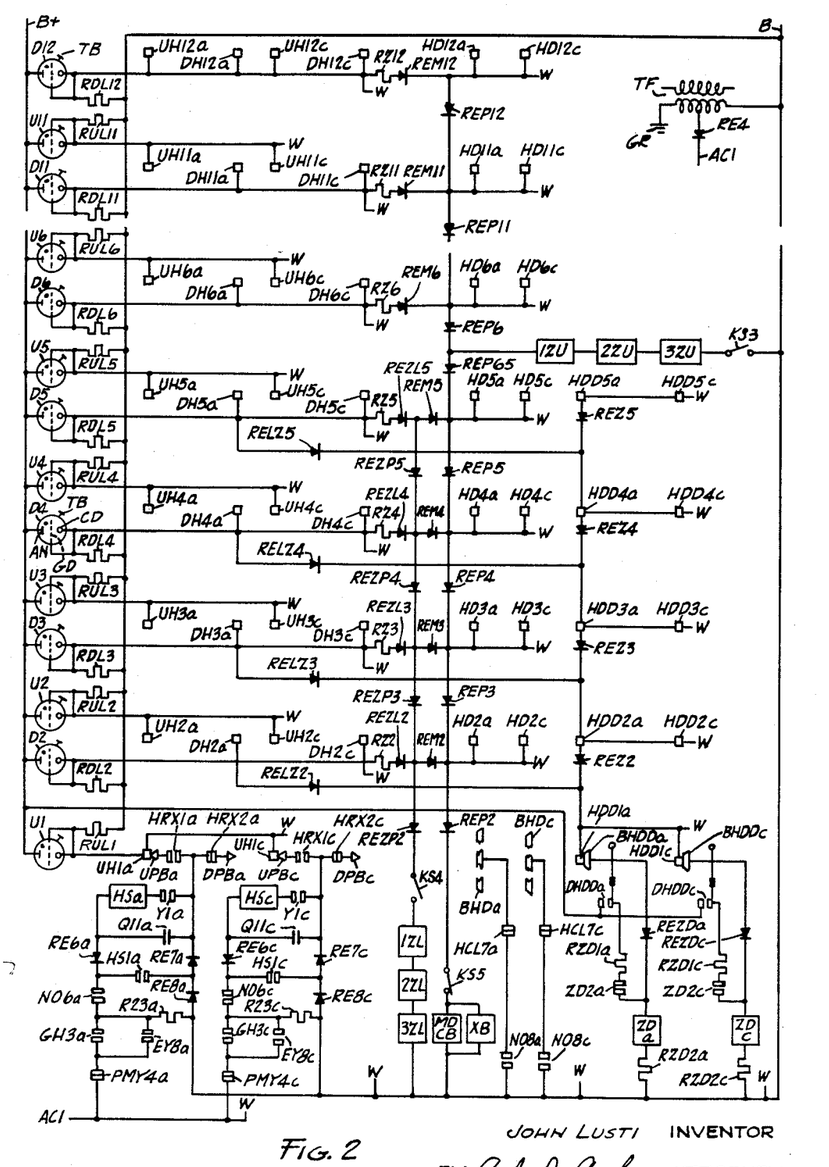
Figure 2 is a simplified schematic wiring diagram of control circuits for two cars of a three or more car group of elevators, including the landing call registration circuits, call pickup and cancelling circuits, down landing call ahead measuring circuits and zoning circuits.
Figure 3:
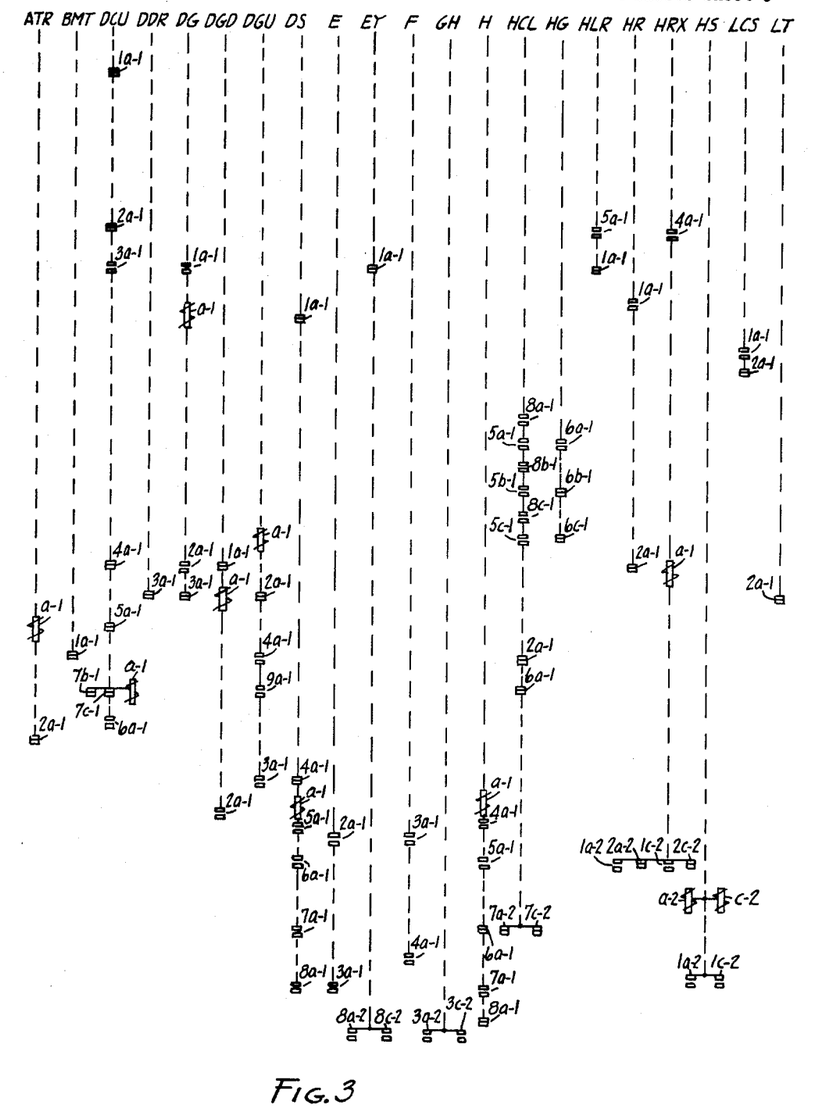
Figures 3 and 4 are spindle sheets for use in side-by-side alignment with Figures 1 and 2 for locating the coils and contacts in Figures 1 and 2; the number of the figure in which a particular coil or pair of contacts appears being appended, following a dash, to the particular designation for that coil or pair of contacts.
Figure 4:
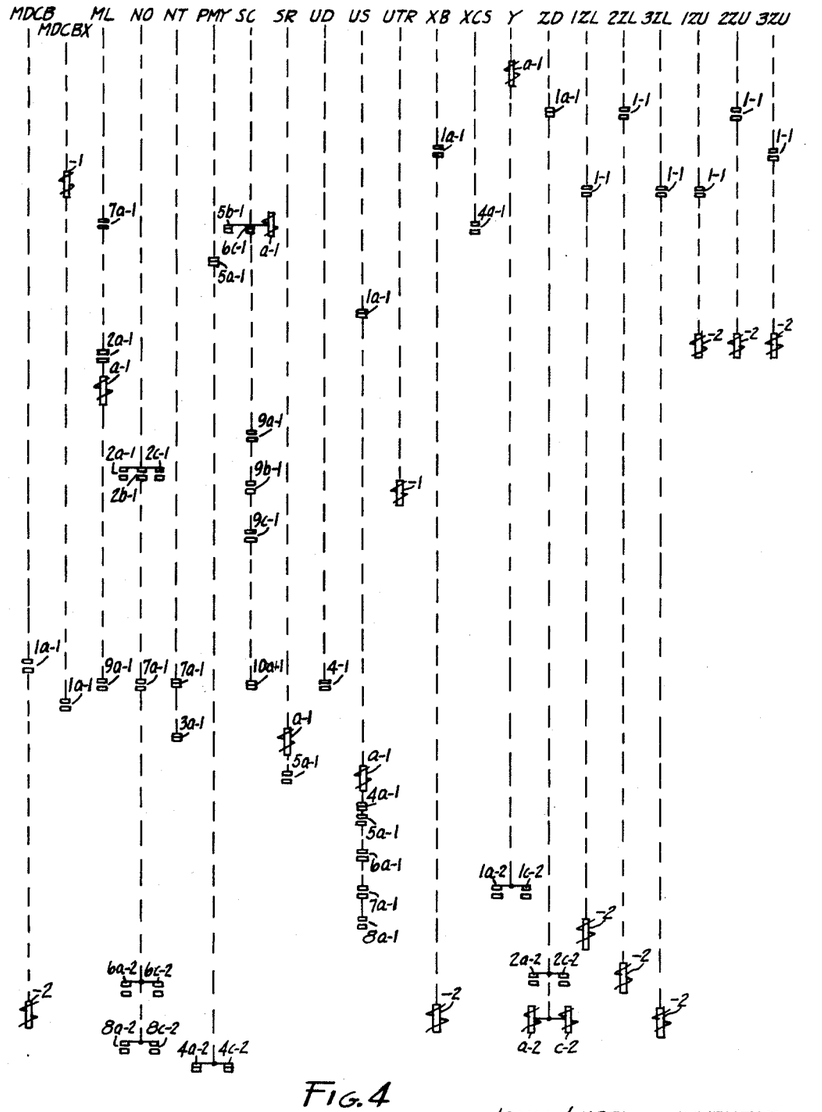

The circuits of Figure 2 are supplied with unidirectional power over supply lines B+ and B. Landing call circuits for a twelve floor installation served by a three car group have been shown. U designates up landing call buttons and D designates down landing call buttons, numerals being appended for indicating the landing for which the buttons are provided. The landing call circuits for the 7th to 10th landings inclusive, for the sake of brevity, have been omitted, it being understood that they are in all cases similar to the landing call circuits for the 11th landing. Also for the sake of brevity, the circuits for car $b$ have been omitted, they being the same as the circuits for the cars $a$ and $c$, interconnections to the circuits for car $b$ being indicated by cross-connecting wires W.

Each of these landing buttons U and D comprises an electronic tube and a fixed button TB connected to the tube envelope with the circuits arranged so that the tube conducts in response to the touch of a finger on the button TB and remains conducting, thereby registering the call and enabling the touch to be discontinued. The primary of transformer TF may be supplied with alternating current from any suitable source and provides alternating current for the electronic tube firing circuits. The structure and operation of the landing call registering circuits are more fully disclosed and described in the aforementioned Glaser and Lusti patent.

An understanding of the invention can best be gained from a description of the sequences of operations. Assume that the system is set for substantially balanced traffic in the up and down directions so that up-down traffic switch UD is in operated condition. Further assume that cars $a$ and $b$ are at the dispatching landing and set for up travel, car $b$ being selected as the next car to be dispatched.

Under the conditions assumed, contacts SC5$b$ (Figure 1) are separated and thus selecting relay SC*a* is in released condition, indicating that car *a* has not been selected for dispatching. Also, main landing switch ML*a* and home landing relay HRL*a* are in operated condition, indicating that car *a* is at the dispatching landing, and direction holding switch DG*a* is in set condition, indicating that car *a* is set for up travel. Presently engaged contacts DG2*a* of the direction holding switch maintain auxiliary up direction switch DGU*a* and auxiliary highest call reversal switch HRX*a* in operated condition. Nonstop relay NO*a* is also in operated condition, indicating that car *a* is in service. Up dispatching relay HCL*a* is in released condition. Further assume that sufficient time has expired after car *a* arrived at the dispatching landing for hall time switch NT*a* to be in released condition. With car *a* at the dispatching landing, brush DSB*a* is in engagement with stationary contact DSC1*a*, maintaining auxiliary time relay ATR*a* in operated condition through contacts BMT1*a*, HCL2*a*, DGU4*a* and DCU5*a*.

The number of unanswered down landing call ahead of the cars which causes an unselected car to start upward from the dispatching landing to answer a down landing call depends upon the requirements of the particular installation. This operation is effected through the control of switch MDCB. For the purposes of illustration, it will be assumed that this switch is operated as soon as four unanswered down landing calls are registered ahead of the leading car. To illustrate this operation, assume further that car *c* is at the 11th landing conditioned for downward travel, that down landing calls are registered for the 12th, 5th, 4th and 3rd landings and that an up landing call is registered for the 2nd landing. Under such conditions three down landing call ahead circuits are completed for the coil of the multiple down call ahead switch MDCB (Figure 2), one such circuit extending from the left-hand side of load resistor RDL5 in the down landing call registering circuit for the 5th landing through resistor RZ5, rectifiers REZL5, REM5, REP5, REP4, REP3, REP2, manual switch KS5, coil of switch MDCB and line B to the right-hand side of load resistor RDL5, the other two circuits similarly extending from the left-hand sides of load resistors RDL4 and RDL3 in the down call registering circuits for the 4th and 3rd landings, respectively. Thus current in three of these circuits flows through the coil of switch MDCB. However, it has been assumed that switch MDCB does not operate until four down landing calls are registered ahead of the leading car, that is until current in four such circuits flows through its coil. Under the assumed conditions, although four down landing calls are in registration, brush BHD*c* is in engagement with stationary contact HD11*c* for the 11th landing thereby shunting the down landing call ahead circuits for the 11th landing and above around the coil of switch MDCB, the shunting circuit extending through brush BHD*c*, stationary contact HD11*c*, contacts HCL7*c* and NO8*c* to line B.

Next assume that a down landing call for the 6th landing is registered, completing a fourth circuit through the coil of switch MDCB, this latter circuit extending from the left-hand side of load resistor RDL6 through the coil of switch MDCB, as previously described for the three circuits already completed for this coil. This causes operation of switch MDCB which engages its contacts MDCB1*a* (Figure 1), completing a circuit for the coil of down call up switch DCU*a*, the circuit extending from line W+ through contacts DGU9*a*, SC10*a*, UD4, HCL6*a*, ML9*a*, NT7*a*, MDCB1*a*, NO7*a*, DCU7*b*, DCU7*c* and the coil of switch DCU*a* to line W—. Switch DCU*a*, upon operation, becomes self holding through its self holding contacts DCU6*a*.

Down call up switch DCU*a*, upon operation, also separates its contacts DCU5*a*, interrupting the circuit of the coil of auxiliary time relay ATR*a*. Relay ATR*a* releases after a slight delay provided by the discharge of condenser Q7*a* through its coil. Upon releasing, it closes its contacts ATR2*a*, completing a circuit for the coil of starting relay SR*a*, which relay causes the car and hoistway doors of car *a* to close. Starting relay SR*a* also engages its contacts SR5*a* to complete a circuit for the coils of up direction switch US*a* and field and brake switch H*a* upon the engagement of car and hoistway door contacts G1*a* and DCO*a* as the doors reach closed condition, the circuit extending from line W+ through contacts SR5*a*, G1*a* and DCO*a*, switch SLS1*a*, contacts DGU3*a*, with SS5*a*, contacts DS4*a* and the coils of switches US*a* and H*a* to line W—. This circuit becomes self holding through field and brake switch contacts H4*a*. Switch H*a* operates to engage contacts H5*a* and H7*a* and separate contacts H6*a* and H8*a* and switch US*a* operates to engage contacts US5*a*, US7*a* and US8*a*, causing the starting of the car in the up direction. Incident to the starting of the car, pawl magnet relay PMY*a*, speed switches EY*a*, E*a* and F*a* and hall time switch NT*a* operate, and door limit switch GH and home landing relay HLR*a* release. Switch NT*a*, upon operation, separates its contacts NT3*a*, interrupting the circuit for the coil of relay RS*a* which releases. These operations are described in more detail in the aforementioned Glaser and Lusti patent.

Down call up switch DCU*a* also separates its contacts DCU4*a*, interrupting the circuit for the coil of auxiliary highest call reversal switch HRX*a*. Switch HRX*a* releases to separate contacts HRX1*a* (Figure 2) and engage contacts HRX2*a*, preparing the circuit for the coil of auxiliary stop relay HS*a* for energization through down landing call brush DPB*a* and preventing its energization through up landing call brush UPB*a*.

As car *a* travels upward from the dispatching landing, brush UPB*a* engages stationary contact UH2*a* of the up landing call pickup circuit for the 2nd landing without effect since, as has been stated, contacts HRX1*a* are separated, rendering up landing call brush UPB*a* ineffective. When brush DPB*a* engages stationary contact DH3*a* of the down landing call pickup circuit for the 3rd landing, a circuit is completed for the coil of auxiliary stop relay HS*a* to initiate the slowdown and stopping of the car at the 3rd landing, the pickup circuit extending from the left side of load resistor RDL3, through stationary contact DH3*a*, brush DPB*a*, contacts HRX2*a*, Y1*a*, the coil of switch HS*a*, rectifier RE6*a*, contacts NO6*a*, resistor R23*a* and line B to the right side of load resistor RDL3. Incident to the slowdown of the car at the 3rd landing, pawl magnet relay PMY*a* releases, engaging its contacts PMY4*a* to complete a circuit from the secondary of transformer TF to the cathode of tube D3 over line AC1 through contacts EY8*a*, NO6*a* and HS1*a*, rectifier RE7*a*, contacts HRX2*a*, brush DPB*a* and stationary contact DH3*a* to extinguish the tube, thereby preventing another car from answering that call. Just before the car stops, auxiliary speed switch EY*a* releases, engaging its contacts EY1*a*. Also, a circuit is completed to initiate the opening of the doors. As the car arrives at the 3rd landing, selector switch SLS1*a* (Figure 1) opens, interrupting the circuit for the coils of switches US*a* and H*a* to stop the car. Switch US*a* upon releasing engages its contacts US1*a* to complete a circuit for the reset coil of direction holding switch DG*a*, the circuit extending from line W+ through contacts EY1*a*, DCU3*a*, PMY5*a*, HLR1*a* and DG1*a*, the reset coil of switch DG*a* and contacts US1*a* and DS1*a* to line W—. Here again, these operations have been described in more detail in the aforementioned Glaser and Lusti patent.

Switch DG*a*, upon resetting, separates its contacts DG1*a*, interrupting the circuit for the coil of switch DGU*a*. Switch DGU*a*, upon releasing, separates its contacts DGU3*a* in the circuit for the coil of switch US*a*. As switch DG*a* resests, a circuit is also completed for the coil of auxiliary down direction switch DGD*a* through contacts DG3*a* and DGU2*a*. Switch DGD*a*, upon operation, separates interlock contacts DGD1a in the circuit for the coil of switch DGUa and engages its contacts DGD2a, conditioning the car for travel in the down direction.

Switch DGUa also separates its contacts DGU9a, interrupting the circuit for the coil of switch DCUa which releases. After the hall time has expired, switch NTa releases, engaging its contacts NT3a to complete a circuit through contacts ATR2a for the coil of starting relay SRa. Relay SRa operates to initiate reclosing of the doors. It also engages its contacts SR5a, completing a circuit for the coils of down direction switch DSa and field and brake switch Ha, as the doors reach closed condition. Switches DSa and Ha operate, causing the car to start back toward the dispatching landing. As car a travels toward the dispatching landing, it will stop in response to a down landing call which is registered for the 2nd landing after brush DPBa passes stationary contact DH2a during upward travel of car a.

It will be seen from the foregoing example that under conditions where more than one car is at the dispatching landing, set for up travel and say four down landing calls are registered ahead of all other cars, the unselected car automatically is started upward, conditioned to answer the nearest one of such down landing calls while bypassing up landing calls. Such a car, which may be termed a "back-up" car, stops at the lowest landing for which a down landing call is registered, picks up the passengers at that landing, and then returns to the dispatching landing.

In the foregoing example, assume that car c becomes filled to near capacity at the 11th landing before a down landing call is registered for the 6th landing. Under such conditions non-stop relay NOc releases, as disclosed in the aforementioned Glaser and Lusti patent. Relay NOc, upon releasing, separates its contacts NO8c (Figure 2), interrupting the shunting circuit previously established through stationary contact HD11c, brush BHDc, contacts HCL7c and NO8c to line B. With this shunting circuit disabled, down landing calls above car c, in this case the down landing call for the 12th landing, are effective to energize the coil of switch MDCB. A fourth circuit is thus completed through the coil of switch MDCB, the circuit extending across load resistor RDL12 similar to the circuits traced for the down landing calls for the 5th landing. Therefore, with down landing calls registered for the 12th, 5th, 4th and 3rd landings switch MDCB operates, causing car a to start upward conditioned to answer the down landing call for the lowermost landing, the 3rd landing, as has been previously described. Thus a car which is automatically load bypassing calls is disregarded in determining the number of unanswered down landing calls ahead of the cars.

Next assume that in the foregoing example a down landing call for the 2nd landing is registered before brush DPBa for "back-up" car a engages stationary contact DH2a, associated with the 2nd landing. In such a case, car a stops and reverses at the 2nd landing to pick up passengers instead of travelling to the 3rd landing and then returns to the dispatching landing.

It may be noted that had car a instead of car b been the car selected as the next car to be dispatched, car b instead of car a would have become the "back-up" car and would have been sent upward to answer the lowest down landing call under the previously assumed conditions. Under such conditions, relay SCa (Figure 1) is in operated condition. Thus upon the operation of multiple down call ahead switch MDCB, as has been previously described, a circuit is completed for the coil of down call up switch DCUb for car b, causing car b to become the "back-up" car. Switch DCUb, upon operation, causes car b to start upward, conditioned to stop and reverse at the lowermost landing for which a down landing call is registered, as has been previously described for car a.

For simplicity, the circuits pertaining to basement service, shown in the aforementioned Glaser and Lusti patent, have been omitted. However, under the originally assumed conditions, that is cars a and b at the dispatching landing, car b selected as the next car to be dispatched, car c at the 11th landing conditioned for down travel and four down landing calls in registration ahead of car c, a call for service to the basement is given preference over down landing calls provided that the unselectced car has not already left the dispatching landing as a "back-up" car. To illustrate this, assume that a call for service to the basement is registered for car a. Under such conditions, lowest call switch LCSa for unselected car is a operated, as disclosed in the aforementioned Glaser and Lusti patent. Switch LCSa upon operation, engages its contacts LCS1a (Figure 1) and separates its contacts LCS2a, completing a circuit for the reset coil of direction holding switch DGa, which switch resets, conditioning car a for travel downward to the basement, the circuit extending from line W+ through EY1a, ML2a, LCS1a, DG1a, DGa, US1a and DS1a to line W—.

Switch DGa separates its contacts DG2a, interrupting the circuit for the coils of switches HRXa and DGUa. Switch DGUa, upon releasing, separates its contacts DGU9a, interrupting the circuit for the coil of switch DCUa, cancelling the selection of car a as the "back-up" car. Car a will then travel to the basement, as described in the aforementioned Glaser and Lusti patent.

Next assume that all three cars of the group are at the main landing, set for up travel, car b being selected as the next car to be dispatched and four down landing calls are registered. Under such conditions, switch MDCB operates upon the registration of the 4th down landing call, engaging its contacts MDCB1a in the circuit of the coil of switch DCUa. Similar contacts MDCB1c engage in the circuit for the coil of switch DCUc (not shown). Depending upon the individual characteristics of switches DCUa and DCUc, either switch DCUa or DCUc will be the first to operate. Assuming that switch DCUc operates first, its interlocking contacts DCU7c separate, disabling the circuit for the coil of switch DCUa. Car c thus becomes the "back-up" car and is started upward to answer the lowermost down landing call, as has been previously described for car a.

If it is desired, manual switches KS2a to c may be closed, short-circuiting interlocking contacts DCU7a to c in the circuits for the coils of switches DCUa to c. Under such conditions, both cars a and b become "back-up" cars upon the registration of four down landing calls ahead of all cars and are started upward from the dispatching landing to answer down landing calls, while bypassing up landing calls. Assuming that down landing calls are registered for the 11th, 6th, 4th and 3rd landings, the first car arriving at the 3rd landing stops and reverses its direction of travel and in so doing cancels the down landing call for the 3rd landing, as has been previously described. Thus the other "back-up" car passes the 3rd landing, since the down landing call for that landing has been cancelled, and stops and reverses at the 4th landing. After having picked up their respective passengers, both cars return to the dispatching landing, as has been previously described.

If it is desired, the circuits may be arranged so that upon the registration of a predetermined number of down landing calls ahead of all cars, an unselected car is started upward from the dispatching landing conditioned to answer a predetermined number of such down landing calls, while bypassing up landing calls. Such a car will travel upward, stop and reverse at the highest landing of the lowermost ones for which such predetermined number of such down landing calls exists.

To accomplish this manual switch KS1 for each car, i.e. switch KS1a for car a, is opened. Assume that the conditions of cars and landing calls in registration assumed in the original example are in effect, that is, cars $a$ and $b$ are at the dispatching landing, car $b$ being the selected car, car $c$ is at the 11th landing conditioned for down travel, down landing calls are in registration for the 12th, 5th, 4th and 3rd landings and an up landing call is in registration for the 2nd landing. Under such conditions, as has been previously stated, three circuits are completed through the coil of multiple down call ahead switch MDCB (Figure 2). These three circuits are also completed through the coil of call below switch XB, which coil is connected in parallel with the coil of switch MDCB. For purposes of this embodiment, it will be assumed that call below switch XB is so constructed as to operate upon the completion of one such circuit through its coil and therefore is presently in operated condition, having operated upon the registration of one down landing call ahead of car $c$. Switch $Ya$ (Figure 1) is maintained in operated condition by means of presently engaged parallel contacts XB$1a$ and DCU$1a$.

Next assume that a down landing call for the 6th landing is registered, completing a fourth circuit through the coil of switch MDCB (Figure 2), as has been previously described. Switch MDCB, upon operation, engages its contacts MDCB$1a$ (Figure 1), completing a circuit for the coil of switch DCU$a$ which becomes self holding through contacts DCU$6a$. Car $a$ is thus selected as the "back-up" car and started upward, as has been previously described. Switch DCU$a$, upon operation, also separates its contacts DCU$1a$, removing the short circuit from contacts XB$1a$. Spanner brush BHD$a$ (Figure 2) (on the advancer panel) travels upward in advance of brush DPB$a$ (also on the advancer panel) and therefore engages stationary contact HD$3a$ before brush DPB$a$ engages stationary contact DH$3a$ but after brush DPB$a$ leaves stationary contact DH$2a$. Spanner brush BHD$a$ upon engaging stationary contact HD$3a$ shunts the coil of switch XB through contacts HCL$7a$ and NO$8a$. Switch XB releases, separating its contacts XB$1a$ (Figure 1), interrupting the circuit for the coil of switch $Ya$. Switch $Ya$ upon releasing, separates its contacts Y$1a$ (Figure 2) in the circuit of the coil of relay HS$a$, preventing the operation of the auxiliary stop relay, as brush DPB$a$ engages stationary contact DH$3a$. Thus car $a$ continues past the 3rd landing, the lowermost landing for which a down landing call is registered.

As spanner brush BHD$a$ proceeds upwardly, engaging stationary contact HD$4a$ and riding off stationary contact HD$3a$, a circuit is again completed for the coil of switch XB, but this time only across load resistor RDL$3$, the brush BHD$a$ shunting out the circuits across the load resistors for the higher down landing calls. Switch XB operates to engage its contacts XB$1a$ (Figure 1), again completing a circuit for the coil of switch $Ya$. Switch $Ya$, upon operation, engages its contacts Y$1a$ (Figure 2), preparing a circuit for the coil of relay HS$a$. No circuit is completed for the coil of relay HS$a$ at this time, as brush DPB$a$ has passed off stationary contact DH$3a$. As brush DPB$a$ engages stationary contact DH$4a$ for the 4th landing, a circuit is completed for the coil of switch HS$a$. In the manner previously described, car $a$ stops at the 4th landing and at the expiration of a passenger transfer interval, proceeds downward, responding to the down call for the 3rd landing, and also to a down call for the 2nd landing if later registered, on its trip back to the dispatching landing.

It may be noted that call below switch XB may be selected so as to operate upon the completion of more than one, say two circuits through its coil, in which case the "back-up" car proceeds upward, passing both up and down landing calls until its arrives at a landing for which a down landing call is registered and which is located above two landings for which down landing calls are also registered. The car stops and reverses at such landing above and stops to pick up the down landing calls below on its return to the dispatching landing.

The circuits may also be arranged so that an unselected car at the dispatching landing is selected as a "back-up" car and started upward, conditioned to stop and reverse at the highest landing for which a down landing call is registered in a low zone. Such a low zone may include a plurality of landings in the lower portion of a building. With such an arrangement, an unselected car may become a "back-up" car under conditions where a predetermined number of down landing calls is in registration ahead of the leading car and at least one of such calls is registered for a landing within the low zone and at least one is registered for a landing located above the low zone. To accomplish this, assume that manual switches KS$1$ and KS$2$ for each car are open, switches KS$1a$ and KS$2a$ being illustrated for car $a$ in Figure 1. Also assume that switch TPS for each car is moved into position to insert contacts ZD$1$ of the highest down call zone reversal switch for that car in the circuits for the coil of switch Y for that car. This is illustrated for car $a$ in Figure 1 where switch TPS$a$ renders the coil of switch $Ya$ subject to contacts ZD$1a$. Further assume that manual switches KS$3$, KS$4$ (Figure 2) are closed and KS$5$ is open.

For purposes of this example, the 5th to 2nd landings inclusive are deemed to comprise the low zone and four down landing calls registered ahead of the leading car will cause an unselected car at the dispatching landing to become a "back-up" car, provided that at least one of such calls is registered for a landing within the low zone and one is registered for a landing above the low zone.

Assume that cars $a$ and $b$ are at the dispatching landing, car $b$ being selected as the next car to be dispatched; car $c$ is at the 11th landing, conditioned for down travel; down landing calls are registered for the 12th landing which is above the low zone, the 5th, 4th, 3rd and 2nd landings, which are in the low zone, and up landing calls are registered for the 11th and 3rd landings. Under such conditions, spanner brush BHD$c$ (Figure 2) is in engagement with stationary contact HD$11c$, completing a shunting circuit around the coils of upper zone call ahead switches 1ZU, 2ZU and 3ZU, this shunting circuit extending from the left-hand side of load resistor RDL$12$ through resistor RZ$12$, rectifiers REM$12$, REP$12$, stationary contact HD$11c$, brush BHD$c$, contacts HCL$7c$, NO$8c$ and line B to the right-hand side of load resistor RDL$12$. It can therefore be seen that down landing calls registered behind car $c$, as it travels downward, do not affect the operation of switches 1ZU, 2ZU and 3ZU, provided that car $c$ does not become filled to capacity, causing non-stop switch NO$c$ to release and open its contacts NO$8c$ thus interrupting the shunting circuit.

However, under the assumed conditions, four circuits are completed through the coils of low zone call ahead switches 1ZL, 2ZL and 3ZL, one such circuit extending from the left-hand side of load resistor RDL$5$ through resistor RZ$5$, rectifiers REZL$5$, REZP$5$, REZP$4$, REZP$3$, REZP$2$, manual switch KS$4$, the coils of switches 1ZL, 2ZL, 3ZL and line B to the right-hand side of load resistor RDL$5$; and three similar circuits extending across load resistors RDL$4$, RDL$3$ and RDL$2$, respectively. Low zone call ahead switches 1ZL, 2ZL and 3ZL are selected so as to operate upon the completion of one, two and three such circuits through their coils, respectively; switch 1ZL operating upon the registration of one down landing call in the low zone ahead of the leading car, switch 2ZL operating upon registration of two such calls and switch 3ZL operating upon the registration of three such calls. Therefore, under the assumed conditions, all three switches 1ZL, 2ZL and 3ZL are in operated condition and their respective contacts 1ZL$1$, 2ZL$1$ and 3ZL$1$ (Figure 1) are engaged without effect at this time, since switches 1ZU, 2ZU and 3ZU are in released condition, indicating that there are no down landing calls registered in the upper zone ahead of all cars subject to such calls, as will be explained below.

Four circuits are also completed through the coil of highest down call zone reversal switch ZDa (Figure 2), one such circuit extending from the left-hand side of load resistor RDL5 through rectifiers RELZ5, REZ4, REZ3, REZ2, stationary contact HDD1a, brush BHDDa, rectifier REZDa, the coil of switch ZDa, resistor RZD2a and line B to the right-hand side of load resistor RDL5; similar circuits being completed for the coil of switch ZDa across load resistors RDL4, RDL3 and RDL2, respectively. One such circuit through the coil of switch ZDa is sufficient to cause it to operate. Switch ZDa upon operation, separates its contacts ZD1a (Figure 1) without effect, since a circuit through the coil of the down call reversal switch Ya is maintained by normally engaged contacts DCU1a. Therefore, under the assumed conditions, switch Ya is in operated condition, maintaining its contacts Y1a (Figure 2) engaged, preparing a circuit for the coil of auxiliary stop relay HSa.

Next assume that a down landing call is registered for the 6th landing, which landing is in the upper zone. A circuit is thus completed across load resistor RDL6 for the coils of upper zone call ahead switches 1ZU, 2ZU and 3ZU, the circuit extending from the left side of resistor RDL6 through resistor RZ6, rectifier REM6, REP6, the coils of switches 1ZU, 2ZU, 3ZU, manual switch KS3 and line B to the right side of resistor RDL6. Switches 1ZU, 2ZU and 3ZU are selected so as to operate upon completion of one, two and three such circuits through their respective coils; switch 1ZU operating upon the completion of one such circuit and so on. Switch 1ZU upon operation, engages its contacts 1ZU1 (Figure 1), completing a circuit for the coil of auxiliary multiple down call ahead switch MDCBX, the circuit extending from line W+ through contacts 1ZU1, 3ZL1 and 1ZL1 and coil of switch MDCBX to line W—. Switch MDCBX, upon operation, engages its contacts MDCBX1a, completing a circuit for the coil of down call up switch DCUa, selecting car a as the "back-up" car, the circuit extending from line W+ through contacts DGU9a, SC10a, UD4, HCL6a, ML9a, NT7a, MDCBX1a, NO7a, DCU7b, DCU7c and the coil of switch DCUa to line W—. Switch DCUa, upon operation, engages its self holding contacts DCU6a. Switch DCUa separates contacts DCU1a, interrupting the circuit for the coil of switch Ya. Swith Ya, upon releasing, separates its contacts Y1a (Figure 2), breaking the circuit for the coil of auxiliary stop relay HSa. Switch DCUa also separates its contacts DCU5a (Figure 1) to cause car a to be started upward, as previously described.

Incident to car a starting upward, as brush BHDDa (Figure 2) leaves stationary contact HDD1a, contacts DHDDa engage to maintain the circuit for the coil of switch ZDa through resistor RZD1a and self holding contacts ZD2a. As brush BHDDa engages stationary contact HDD2a, contacts DHDDa separate. However, the circuit for the coil of switch ZDa is maintained through brush BHDDa and contact HDD2a, since down landing calls are in registration for landings in the low zone above the 2nd landing. As brush BHDDa continues upward, the circuit for the coil of switch ZDa is maintained in a manner similar to that described until brush BHDDa engages stationary contact HDD5a which is associated with the highest landing in the low zone for which a down landing call is registered. Brush DPBa also moves upwardly but slightly behind brush BHDDa. Brush DPBa engages stationary contacts DH2a, DH3a and DH4a in succession without effect, since the circuit for the coil of relay HSa is broken by presently separated contacts Y1a, so long as switch ZDa remains operated. As brush BHDDa engages stationary contact HDD5a for the 5th landing, contacts DHDDa separate, interrupting the circuit for the coil of switch ZDa. Switch ZDa, upon releasing, engages its contacts ZD1a (Figure 1), completing a circuit for the coil of switch Ya. Switch Ya, upon operation, engages its contacts Y1a (Figure 2) in the circuit of the coil of relay HSa. As brush DPBa engages stationary contact DH5a for the 5th landing, a circuit is completed across load resistor RDL5 for the coil of auxiliary stop relay HSa, causing slowdown of car a to be initiated for bringing it to a stop at the 5th landing, and also cancelling the down 5th landing call. Also, as the car comes to a stop, it becomes set for downward travel, as previously explained. After a passenger transfer time has expired, car a starts downward toward the dispatching landing answering unanswered down landing calls at intervening floors.

It may be noted that, assuming that instead of a down landing call registered for the 5th landing, the 4th landing is the highest landing in the low zone for which a down landing call is registered, the circuit for the coil of switch ZDa (Figure 2) is interrupted as brush BHDDa engages stationary contact HDD4a. In such a case, a circuit is completed for the coil of relay HSa as brush DPBa engages stationary contact DH4a for the 4th landing and car a stops and reverses at the 4th landing, the highest landing in the low zone for which a down landing call is registered.

It may also be noted, that if it is assumed that four down landing calls are in registration ahead of all cars for landings above the low zone but no down landing calls are in registration for a landing in the low zone, a "back-up" car is not selected, since in such a case switch 1ZL is in released condition, maintaining its contacts 1ZL1 (Figure 1) separated, disabling the circuit for the coil of switch MDCBX. However, as soon as one down landing call ahead of all cars is registered for a landing in the low zone while there are at least three such calls registered for landings above the low zone, a circuit is completed through contacts 3ZU1 and 1ZL1 for the coil of switch MDCBX to cause an unselected car to become a "back-up" car. Similarly, four such down landing calls ahead, two registered for landings above the low zone and two for landings in the low zone, cause a circuit to be completed through contacts 2ZU1, 2ZL1 and 1ZL1 for the coil of switch MDCBX, causing an unselected car to become a "back-up" car. It is seen by inspection of the circuits for the coil of switch MDCBX that with this arrangement at least four down landing calls ahead of all cars must be in registration and at least one of these calls must be registered for a landing in the low zone and one for a landing above the low zone before an unselected car at the main landing may become a "back-up" car and be started upward, as has been described.

Next will be described the manner in which cars which have not become "back-up" cars but have been selected for dispatching from the dispatching landing are dispatched. Assume that car b was previously selected as the next car to be dispatched and having been dispatched is traveling upward away from the dispatching landing. Next assume that cars a and c are at the dispatching landing, set for up travel, car a being selected as the next car to be dispatched. Under such conditions, selection relay SCa is in operated condition, indicating that car a has been selected for dispatching; up dispatching relay HCLb is in operated condition, indicating that car b, the previously selected car, has been dispatched and is traveling upward; and non-stop relays NOa to c are in operated condition, indicating that cars a to c are in service. Thus a circuit for the coil of up time relay UTR (Figure 1) is completed through contacts SC9a, HG6a and HCL5b.

Next assume that a car call is registered for selected car a, causing highest car call switch HGa to operate, as described in the aforementioned Glaser and Lusti patent. Switch HGa separates its contacts HG6a, interrupting the circuit for the coil of relay UTR. Relay UTR remains operated for a time interval provided by condenser Q1 discharging through its coil. This interval may be termed the dispatching time interval, at the expiration of which the selected car is dispatched. After condenser Q1 has discharged sufficiently, relay UTR releases, completing a circuit for the coil of dispatching relay HCL*a*, causing this relay to operate and become self holding as disclosed in the aforementioned Glaser and Lusti patent. Relay HCL*a* engages its contacts HCL8*a*, completing a circuit for the coil of relay UTR through contacts SC9*a* to actuate relay UTR again into operated condition. Relay HCL*a* also separates its contacts HCL2*a*, interrupting the circuit for the coil of relay ATR*a* (Figure 1). After a slight delay provided by condenser Q7*a*, relay ATR*a* releases, engaging its contacts ATR2*a* to complete a circuit for the coil of starting relay SR*a*. Relay SR*a* upon operation, starts car *a* in the up direction provided the doors reach their closed position, as has been previously described.

Relay SR*a* also completes a circuit for the coil of highest call reversal switch HR*a*, as described in the aforementioned Glaser and Lusti patent. Switch HR*a*, upon operation, completes a circuit for the coil of switch HRX*a* to condition car *a* to answer up landing calls while bypassing down landing calls. Switch HRX*a* separates its contacts HRX4*a* in the circuit of the coil of relay SC*a*, causing selection for dispatching to be transferred to car *c* by causing operation of relay SC*c*, as described in the aforementioned Glaser and Lusti patent. Relay SC*a* upon releasing, also separates its contacts SC9*a*, interrupting a circuit for the coil of relay UTR. However, relay SC*c* engages contacts SC9*c* to maintain relay UTR in operated condition by establishing a circuit through contacts HG6*c*, HCL5*a* and HCL5*b*. Assuming that no car calls are registered for car *c*, relay UTR remains operated and the dispatching interval is not initiated until all cars, previously selected and dispatched upward, reverse their direction of travel.

As car *b* reverses its direction of travel, as described in the aforementioned Glaser and Lusti patent, relay HCLB releases, separating its contacts HCL5*b* without effect, since the circuit for the coil of relay UTR is maintained through contacts HCL5*a*. As car *a* also reverses its direction of travel, relay HCL*a* releases, separating its contacts HCL5*a* to interrupt the circuit for the coil of relay UTR, thereby initiating the dispatching time interval. After condenser Q1 has discharged sufficiently, relay UTR releases, causing car *c* to be dispatched, as has been previously described for car *a*.

Assume that a car call is registered for car *c* prior to the reversal of car *a* in the above example. Switch HG*c* releases, separating its contacts HG6*c* to interrupt the circuit for the coil of relay UTR, thereby initiating the dispatching time interval upon the registration of a car call for the selected car instead of upon the reversal of all up travelling cars.

It can therefore be seen that the dispatching time interval is initiated upon the registration of a car call in a selected car or upon the reversal of all previously selected up travelling cars whichever occurs earlier.

It may be noted that the subject invention is also applicable to an installation in which the cars are dispatched from the upper terminal landing. In such a case, an unselected car at the upper terminal dispatching landing becomes a "back-up" car upon the registration of a predetermined number of up landing calls ahead of all cars and responds in a manner similar to that described for the lower terminal dispatching landing, depending upon the particular arrangement of circuits utilized. For example, such a "back-up" car is started downward, conditioned to bypass down landing calls. Upon arriving at the landing nearest to the upper terminal for which such an up landing call is registered, the "back-up" car stops, reverses its direction of travel, picks up passengers and then returns to the upper terminal.

As changes can be made in the above described construction and many apparently different embodiments of this invention can be made without departing from the scope thereof, it is intended that all matter contained in the above description or shown on the accompanying drawings be interpreted as illustrative only and not in a limiting sense.

What is claimed is:

1. A control system for a plurality of elevator cars serving a plurality of landings from a terminal landing comprising, a plurality of landing call registering means common to said cars, one for each of said plurality of landings, for registering calls for service in a direction toward said terminal landing, means responsive to said landing call registering means for determining the number of said landing calls registered ahead of a certain one of said cars on its trip to said terminal landing, and means controlled by said determining means for sending a car from said terminal landing conditioned to answer at least a predetermined one of said registered landing calls under conditions where a predetermined number of such landing calls is so registered.

2. A control system for a plurality of elevator cars serving a plurality of landings from a lower terminal landing comprising, a plurality of down landing call registering means common to said cars, one for each of said plurality of landings, determining means operable upon the registration by said registering means of a certain number of down landing calls ahead of a leading car, and control means responsive to operation of said determining means under conditions where more than one car is at said lower terminal landing for causing one of such cars to become a "back-up" car to assist said leading car in answering down landing calls that are registered.

3. A control system for a plurality of elevator cars serving a plurality of landings including a lower terminal landing comprising, a plurality of down landing call registering means common to said cars, one for each of said plurality of landings, means for determining the number of such registered down landing calls ahead of at least a certain one of said cars, and means controlled by said determining means under conditions where more than one car is at said terminal landing for sending one of such cars from said terminal landing conditioned to answer the down landing call for the landing nearest said lower terminal for which such a call is registered when such down landing calls exceed a predetermined number.

4. A control system for a plurality of elevator cars serving a plurality of landings from a terminal landing comprising, a plurality of landing call registering means common to said cars, one for each of said plurality of landings, for registering calls for service in a direction toward said terminal landing, means responsive to said landing call registering means for determining the number of such landing calls registered ahead of all cars, and means controlled by said determining means under conditions where more than one car is at said terminal landing for sending one of such cars from said terminal landing conditioned to answer the landing call registered for the landing nearest said terminal landing for which such a call is registered, under conditions where a predetermined number of said landing calls is registered ahead of all cars.

5. A control system for a plurality of elevator cars serving a plurality of landings from a terminal landing comprising, a plurality of landing call registering means common to said cars, one for each of said plurality of landings, for registering calls for service in the direction toward said terminal landing, dispatching mechanism for said cars for dispatching said cars from said terminal landing, means for selecting a car for dispatching by said dispatching mechanism, and means responsive to a predetermined number of said landing calls registered ahead of all cars for causing an unselected car at said terminal landing to answer the call for the landing nearest said terminal landing for which such a call is registered.

6. A control system for a plurality of elevator cars serving a plurality of landings and a lower terminal landing comprising, a plurality of down landing call registering means common to said cars, one for each of said plurality of landings, means responsive to said down landing call registering means for determining the number of down landing calls registered ahead of all cars, dispatching mechanism for said cars for dispatching said cars from said lower terminal landing, means for selecting a car for dispatching by said dispatching mechanism, and means responsive to operation of said determining means, under conditions where a predetermined number of said down landing calls is registered ahead of all cars, for sending an unselected car from said lower terminal landing conditioned to answer the down landing call registered for the landing nearest to said lower terminal for which such a call is registered.

7. A control system for a plurality of elevator cars serving a plurality of landings from a terminal landing comprising, landing call registering means common to the cars for each of said plurality of landings for registering calls for service in the direction toward said terminal landing, dispatching mechanism for said cars for dispatching said cars from said terminal landing, means for selecting a car for dispatching by said dispatching mechanism, means responsive to a predetermined number of said landing calls registered ahead of the leading car for causing an unselected car at said terminal landing to start from said terminal landing and stop at the landing nearest said terminal landing for which a call is registered in response to such call, and means for setting the car for travel in the opposite direction as such stop at such nearest landing is made and, after expiration of a passenger transfer interval, for causing return of the car to said terminal landing.

8. A control system for a plurality of elevator cars serving a plurality of landings from a lower terminal landing comprising, a plurality of down landing call registering means common to the cars, one for each of said plurality of landings, dispatching mechanism for said cars for dispatching said cars upward from said lower terminal landing, means for selecting a car for dispatching by said dispatching mechanism, means responsive to a predetermined number of said down landing calls registered ahead of the leading car for causing an unselected car at said lower terminal landing to start in the up direction and stop at the landing nearest said lower terminal landing for which such a down landing call is registered in response to such call, and means for setting that car for travel in the down direction as such stop at such nearest landing is made and, after expiration of a passenger transfer interval, for causing that car to start in the down direction and to stop in response to later registered down landing calls at landings for which such later calls are registered as it travels downward from such nearest landing to said lower terminal landing.

9. A control system for a plurality of elevator cars serving a plurality of landings from a lower terminal landing, said control system comprising, a plurality of down landing call registering means common to said cars, one for each of said plurality of landings, determining means operable upon the registration by said registering means of a certain number of down landing calls ahead of a leading car, load bypass means for each of said cars for causing that car when loaded to a certain percent of capacity to run past landings for which such landing calls are registered without stopping in response to such landing calls, transfer means responsive to operation of said load bypass means for the leading car for rendering that car ineffective as the leading car and the next following car effective as the leading car in said determination of said certain number of said down landing calls ahead, and control means responsive to operation of said determining means under conditions where more than one car is at said lower terminal landing for causing one of such cars to start upward and stop at the landing nearest to said lower terminal landing for which a down landing call is registered, said control means after the expiration of a passenger transfer time causing said car to return to said lower terminal landing.

10. A control system for a plurality of elevator cars serving a plurality of landings including a lower terminal landing and a basement landing located below said lower terminal landing, said control system comprising a plurality of down landing call registering means common to said cars, one for each of said plurality of landings excluding said lower terminal landing and said basement landing, determining means operable upon the registration by said registering means of a certain number of down landing calls ahead of a leading car, first control means responsive to operation of said determining means under conditions where more than one car is at said lower terminal landing for causing one of such cars to become a "back-up" car to assist said leading car in answering down landing calls, basement service means for registering calls for service to said basement landing, and second control means operable upon registration by said basement service means of a call for service for said one of such cars under conditions where that car is at said lower terminal landing, for rendering said first control means ineffective to cause that car to assist said leading car in answering down landing calls and for causing that car to travel downward from said lower terminal landing to said basement landing.

11. A control system for a plurality of elevator cars serving a plurality of landings from a lower terminal landing, said control system comprising, a plurality of down landing call registering means common to said cars, one for each of said plurality of landings, determining means operable upon the registration by said registering means of a certain number of down landing calls ahead of a leading car, dispatching mechanism for said cars for dispatching said cars upward from said lower terminal landing, means for selecting a car at said lower terminal landing for dispatching by said dispatching mechanism, and control means responsive to operation of said determining means under conditions where more than one car is at said lower terminal landing for causing each of such unselected cars to start upward and to answer a different one of the lowermost unanswered existing down landing calls and, after the expiration of a passenger transfer time, to return to said lower terminal landing.

12. A control system for a plurality of elevator cars serving a plurality of landings from a lower terminal landing, said control system comprising, a plurality of down landing call registering means common to said cars, one for each of said plurality of landings, determining means operable upon the registration by said registering means of a certain number of down landing calls ahead of a leading car, and control means responsive to operation of said determining means under conditions where more than one car is at said lower terminal landing for causing one of such cars to start upward and stop at a landing for which a down landing call is registered and which is located above a certain number of other landings for which down landing calls exist, said control means after the expiration of a passenger transfer time also causing said car to return to said lower terminal landing, answering down landing calls as it travels downward.

13. A control system for a plurality of elevator cars serving a plurality of landings from a lower terminal landing, said control system comprising, a plurality of down landing call registering means common to said cars, one for each of said plurality of landings, determining means operable upon the registration by said registering means of a certain number of down landing calls ahead of a leading car, and control means responsive to operation of said determining means under conditions where more than one car is at said lower terminal landing for causing one of such cars to start upward and stop at the highest landing of the lowermost of said landings for which a predetermined number of down landing calls exists, said control means after the expiration of a passenger transfer time causing said car to return to said lower terminal landing, answering down landing calls as it travels downward.

14. A control system for a plurality of elevator cars serving in a building a plurality of landings from a lower terminal landing, a predetermined number of said plurality of landings being in a low zone immediately above said lower terminal landing in the lower portion of the building, said control system comprising, a plurality of down landing call registering means common to said cars, one for each of said plurality of landings, control means operable in response to registration of a predetermined number of down landing calls ahead of all cars by said call registering means, provided at least one of such calls is registered for a landing within said zone and at least one other of such calls is registered for a landing above said zone, and means controlled by operation of said control means for starting an extra car upward from said lower terminal and stopping that car at the highest landing in said zone for which a down landing call is registered to answer that call, and then restart that car downward toward said lower terminal.

15. A control system for a plurality of elevator cars serving in a building a plurality of landings from a terminal landing, said plurality of landings including a low zone consisting of a predetermined number of said landings in the lower portion of said building, said control system comprising, selecting means for selecting the next car to be started upward from said lower terminal, a plurality of down landing call registering means common to the cars, one for each of said landings, first call detecting means responsive to said down landing call registering means for detecting the registration of down landing calls for from one to a certain number of landings within said low zone and ahead of all cars, second call detecting means responsive to said down landing call registering means for detecting the registration of down landing calls for from one to a certain number of landings above said low zone and ahead of all cars, and control means subject to said first and second call detecting means and operable upon the registration of a predetermined number of down landing calls ahead of all cars under conditions where at least one of such calls is registered for a landing within said low zone and at least one is registered for a landing above said low zone, said control means upon operation causing an unselected car to start upward from said lower terminal, to stop at the highest landing within said low zone for which such a down landing call is registered, to answer such call and then to restart downward toward said lower terminal, answering down calls registered for landings below said highest landing in said low zone.

16. A control system for a plurality of elevator cars serving a plurality of landings including an upper and a lower terminal landing comprising, car actuating and stopping mechanism, means for selecting the next car to be started upward from said lower terminal landing, up landing call registering means for each of said landings between said terminal landings, down landing call registering means for each of a plurality of said landings including said upper terminal landing, call pickup means for each car responsive to the calls that are registered to cause operation of said car actuating and stopping mechanism for that car to stop the car during upward travel at landings for which up landing calls are registered and during downward travel of that car at landings for which down landing calls are registered, down landing call responsive means operatively responsive to the registration of a predetermined number of down landing calls for landings located below the lowermost car travelling downward, and control means operable upon actuation of said down landing call responsive means for causing operation of said car actuating and stopping mechanism, for a car at the lower terminal landing which has not been selected by said selecting means, to start that car upward and to stop it at the lowermost landing for which a down landing call is registered, to set that car for downward travel as it is brought to a stop at said lowermost landing and after a passenger transfer interval, restart that car downward toward said lower terminal landing, said control means when so operated also rendering said call pickup means for that car ineffective to cause said car actuating and stopping mechanism for that car to stop that car during upward travel at landings for which up landing calls are registered.

17. A control system for a plurality of elevator cars serving a plurality of landings including an upper terminal landing and a lower terminal landing, said control system comprising, car actuating and stopping mechanism for each car, means for selecting the next car to be started upward from said lower terminal landing, up landing call registering means for each of said landings between said terminal landings, down landing call registering means for each of said plurality of landings excluding said lower terminal landing, call pickup means for each car responsive to the calls that are registered to cause operation of said car actuating and stopping mechanism for that car to stop the car during upward travel at landings for which up landing calls are registered and during downward travel of that car at landings for which down landing calls are registered, means operatively responsive to the registration by said down landing call registering means of a predetermined number of down landing calls ahead of all cars, and control means operable in response to operation of said down landing call responsive means for causing operation of said car actuating and stopping mechanism for cars which have not been selected by said selecting means, to start such unselected cars upward and to cause said call pickup means for such unselected cars to respond to down landing calls while bypassing up landing calls during upward travel of such cars, whereby each of said such unselected cars is caused to stop at a landing for which an unanswered down landing call is registered, said control means acting to set each of such unselected cars for downward travel at the landing at which such car is stopped and after expiration of a passenger transfer time, restarting such unselected car downward toward said lower terminal landing.

18. A control system for a plurality of elevator cars serving a plurality of landings including an upper terminal landing and a lower terminal landing, said control system comprising, car actuating and stopping mechanism for each car, means for selecting the next car to be started upward from said lower terminal landing, up landing call registering means for each of said landings between said terminal landings, down landings excluding said lower terminal landing, call pickup means for each car responsive to the calls that are registered to cause operation of said car actuating and stopping mechanism for that car to stop the car during upward travel at landings for which up landing calls are registered and during downward travel of that car at landings for which down landing calls are registered, means operatively responsive to registration by said down landing call registering means of a predetermined number of down landing calls ahead of all cars, and control means operable upon operation of said down landing call responsive means for causing operation of said car actuating and stopping mechanism for a car which has not been selected by said selecting means, to start that car upward and to stop it at a landing for which a down landing call is registered and which is located above at least one other landing for which a down landing call is also registered, to set that car for downward travel as it is brought to a stop at such landing and after expiration of a passenger transfer interval, restart that car downward toward said lower terminal landing, said control means when so operated also rendering said call pickup means for that car ineffective to cause operation of said car actuating and stopping mechanism for that car to stop that car during upward travel at landings for which up landing calls are registered.

19. A control system for a plurality of elevator cars serving in a building a plurality of landings, said floor landings including an upper and a lower terminal landing and a low zone consisting of the landings in the lower portion of said building, said control system comprising, car actuating and stopping mechanism for each car, means for selecting the next car to be started upward from said lower terminal landing, up landing call registering means for each of said landings between said terminal landings, down landing call registering means for each of said plurality of landings excluding said lower terminal landing, call pickup means for each car responsive to the calls that are registered to cause operation of said car actuating and stopping mechanism for that car to stop that car during upward travel at landings for which up landing calls are registered and during downward travel of that car at landings for which down landing calls are registered, means operatively responsive to the registration by said down landing call registering means of a predetermined number of down landing calls for landings located below the lowermost down travelling car under conditions where at least one of such calls is registered for such a landing within said low zone and at least one of such calls is registered for such a landing located above said low zone, and control means operable upon actuation of said down landing call responsive means for causing operation of said car actuating and stopping mechanism for a car which has not been selected by said selecting means, to start that car upward and to stop it at the highest landing within said low zone for which a down landing call is registered, to set that car for downward travel as it is brought to a stop at said highest landing and after expiration of a passenger transfer interval, restart that car downward, said control means when so operated also rendering said call pickup means for that car ineffective to cause operation of said car actuating and stopping mechanism for that car to stop that car during upward travel at landings for which up landing calls are registered.

20. A control system for a plurality of elevator cars serving a plurality of landings including an upper terminal landing, a lower terminal landing and a basement landing located below said lower terminal landing, said control system comprising, car actuating and stopping mechanism for each car, means for selecting the next car to be started upward from said lower terminal landing, up landing call registering means for each of said landings between said terminal landings, down landing call registering means for each of said plurality of landings excluding said lower terminal and basement landings, call pickup means for each car responsive to the calls that are registered to cause operation of said car actuating and stopping mechanism for that car to stop the car during upward travel at landings for which up landing calls are registered and during downward travel of that car at landings for which down landing calls are registered, means operatively responsive to registration by said down landing call registering means of a predetermined number of down landing calls for landings located ahead of the leading one of said cars, first control means operable upon operation of said down landing call responsive means for causing operation of said car actuating and stopping mechanism, for a car which has not been selected by said selecting means, to start that car upward and to stop it at the lowermost landing for which a down landing call is registered, to set that car for downward travel as it is brought to a stop at said lowermost landing and after a passenger transfer interval, restart that car downward toward said lower terminal landing, said first control means when so operated also rendering said call pickup means for that car ineffective to cause operation of said car actuating and stopping mechanism for that car to stop that car during upward travel at landings for which up landing calls are registered, means for registering a landing call for said basement landing, means for each car for registering a basement car call, and second control means responsive to registration by said basement landing call registering means of said basement landing call and to registration by said car call registering means for an unselected car of a basement car call, for causing said actuating and stopping mechanism for that unselected car to start that car downward from said lower terminal to serve said basement and for rendering said first control means ineffective to start said unselected car upward from said lower terminal.

References Cited in the file of this patent
UNITED STATES PATENTS 2,376,218    Williams _______________ May 15, 1945
2,589,242    Glaser _________________ Mar. 18, 1951

UNITED STATES PATENT OFFICE

CERTIFICATION OF CORRECTION

Patent No. 2,936,859                      May 17, 1960

John Lusti

It is hereby certified that error appears in the above numbered patent requiring correction and that the said Letters Patent should read as corrected below.

Column 6, line 10, for "with" read -- switch --; line 22, for "RSa" read -- SRa --; column 11, line 44, for "Swith" read -- Switch --; column 18, line 52, after "down" insert -- landing call registering means for each of said plurality of --.

Signed and sealed this 11th day of July 1961.

(SEAL)
Attest:

ERNEST W. SWIDER
Attesting Officer

DAVID L. LADD
Commissioner of Patents